United States Patent
Striegel et al.

(10) Patent No.: US 12,390,970 B2
(45) Date of Patent: Aug. 19, 2025

(54) HEATING DEVICE

(71) Applicant: Incoe Corporation, Auburn Hills, MI (US)

(72) Inventors: Christian Striegel, Hessen (DE); Scott Greb, Washington Township, MI (US); Anton Joerg, Bayern (DE)

(73) Assignee: Incoe Corporation, Auburn Hills, MI (US)

( * ) Notice: Subject to any disclaimer, the term of this patent is extended or adjusted under 35 U.S.C. 154(b) by 23 days.

(21) Appl. No.: 17/650,107

(22) Filed: Feb. 7, 2022

(65) Prior Publication Data
US 2023/0010091 A1    Jan. 12, 2023

(51) Int. Cl.
*B29C 45/73* (2006.01)
*B29C 45/27* (2006.01)
*B29C 45/78* (2006.01)

(52) U.S. Cl.
CPC .............. *B29C 45/73* (2013.01); *B29C 45/27* (2013.01); *B29C 45/78* (2013.01); *B29C 2945/7604* (2013.01); *B29C 2945/7626* (2013.01)

(58) Field of Classification Search
CPC ..... B29C 45/73; B29C 45/0025; B29C 45/27; B29C 45/2737; B29C 45/28; B29C 45/2806; B29C 45/7331; B29C 2045/7393; B29C 45/2725; B29C 45/2738
See application file for complete search history.

(56) References Cited

U.S. PATENT DOCUMENTS

| | | | |
|---|---|---|---|
| 3,911,251 A | | 10/1975 | Day |
| 4,786,246 A | | 11/1988 | Gellert |
| 5,106,291 A | * | 4/1992 | Gellert ............... B29C 45/2806 425/549 |
| 5,225,211 A | * | 7/1993 | Imaida ................... B29C 45/30 425/549 |
| 6,294,122 B1 | * | 9/2001 | Moss .................. B29C 45/2806 264/328.9 |
| 7,025,586 B2 | * | 4/2006 | Fischer ............... B29C 45/2711 425/566 |

(Continued)

FOREIGN PATENT DOCUMENTS

| | | |
|---|---|---|
| DE | 10 2014 114 772 A1 | 4/2016 |
| EP | 0512286 A3 | 11/1992 |

(Continued)

OTHER PUBLICATIONS

JP2009226778A—Machine Translation (Year: 2009).*

(Continued)

*Primary Examiner* — Yunju Kim
(74) *Attorney, Agent, or Firm* — Gunther J. Evanina; BUTZEL LONG

(57) ABSTRACT

Heating device for locally heating of an injection mold cavity wall, comprising: a base plate, an actuator located on the base plate, to perform a linear movement; a heated stamp connected to the actuator and driven by the actuator, to perform a linear movement in direction to and from the injection mold cavity wall; wherein the heated stamp is located below the base plate and the actuator is located on top of the base plate, and wherein the base plate comprises an opening through which a pin extends for transferring the linear movement from the actuator to the heated stamp.

12 Claims, 10 Drawing Sheets

(56) References Cited

U.S. PATENT DOCUMENTS

2004/0166189 A1* 8/2004 Babin ................ B29C 45/2806
                                                         425/570
2015/0151471 A1   6/2015 Roctool

FOREIGN PATENT DOCUMENTS

| JP | 3814169    | 2/2003  |
|----|------------|---------|
| JP | 3888580    | 12/2003 |
| JP | 2007223168 | 9/2007  |
| JP | 2009226778 | 10/2009 |

OTHER PUBLICATIONS

JP2003/033957A _Machine Translation (Year: 2003).*
European Search Report, Jan. 21, 2022, (13 pages).
European Search Report, Jul. 13, 2022, (10 pages).
Do, Thanh Trung, et al., The Feasibility of an Internal Gas-Assisted Heating Method for Improving the Melt Filling Ability of Polyamide 6 Thermolastic Composites in a Thin Wall Injection Molding Process, Polymers, 2021 (Published on Mar. 24, 2021), vol. 13, 17 pages.
Chen, Shia-Chung et al., Gas-Assisted Heating Technology for High Aspect Ratio Microstructure Injection Molding, Advances in Mechanical Engineering, 2013, vol. 2013, Article ID 282906, 10 pages.
Murata, Yasuhiko, et al., Effects of Healing and Cooling of Injection Mold Cavity Surface and Melt Flow Control on Properties of Carbon Fiber Reinforced Semi-Aromatic Polyamide Molded Products, Polymers, 2021 (published on Feb. 15, 2021), vol. 13, 18 pages.
Extended European Search Report issued in App. No. EP23189990.7, dated Dec. 4, 2023, 7 pages.

* cited by examiner

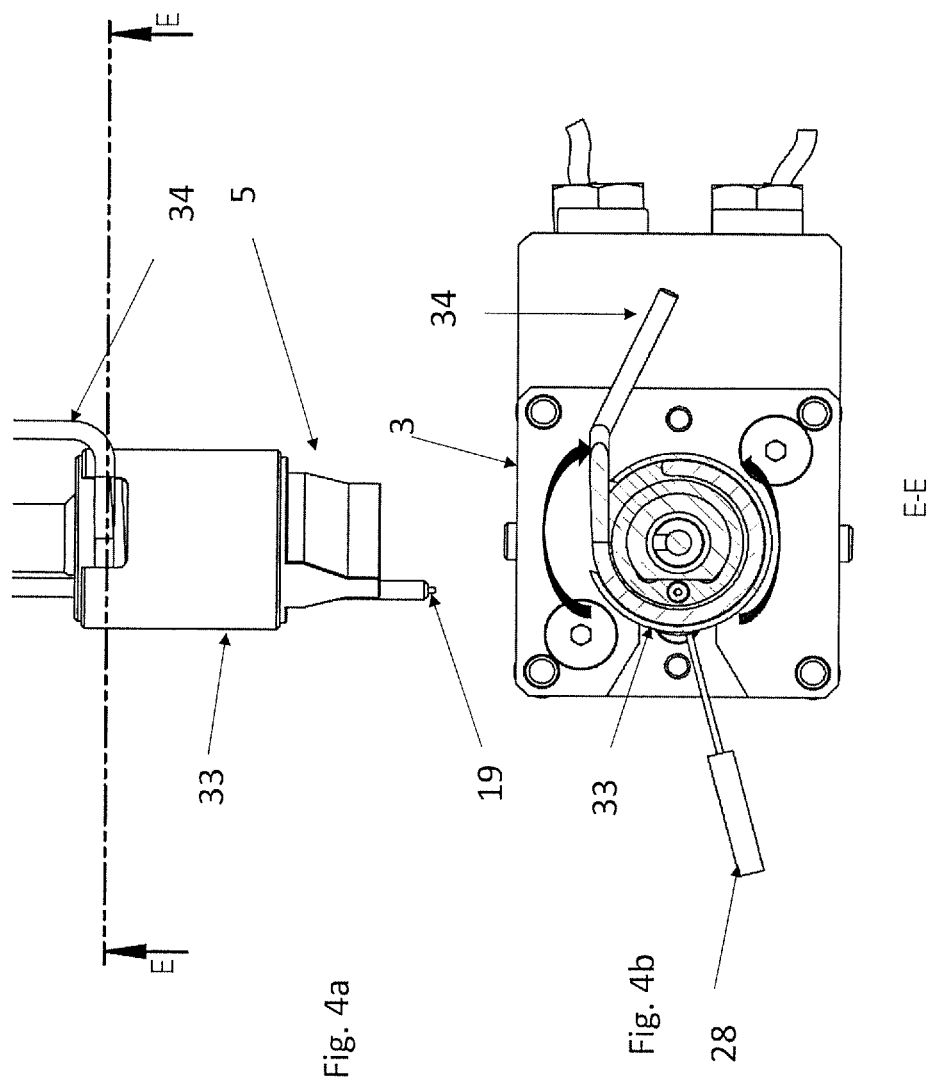
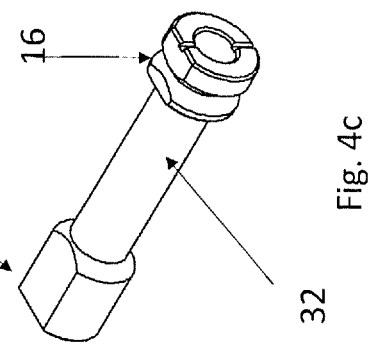
Fig. 4a
Fig. 4b
Fig. 4c

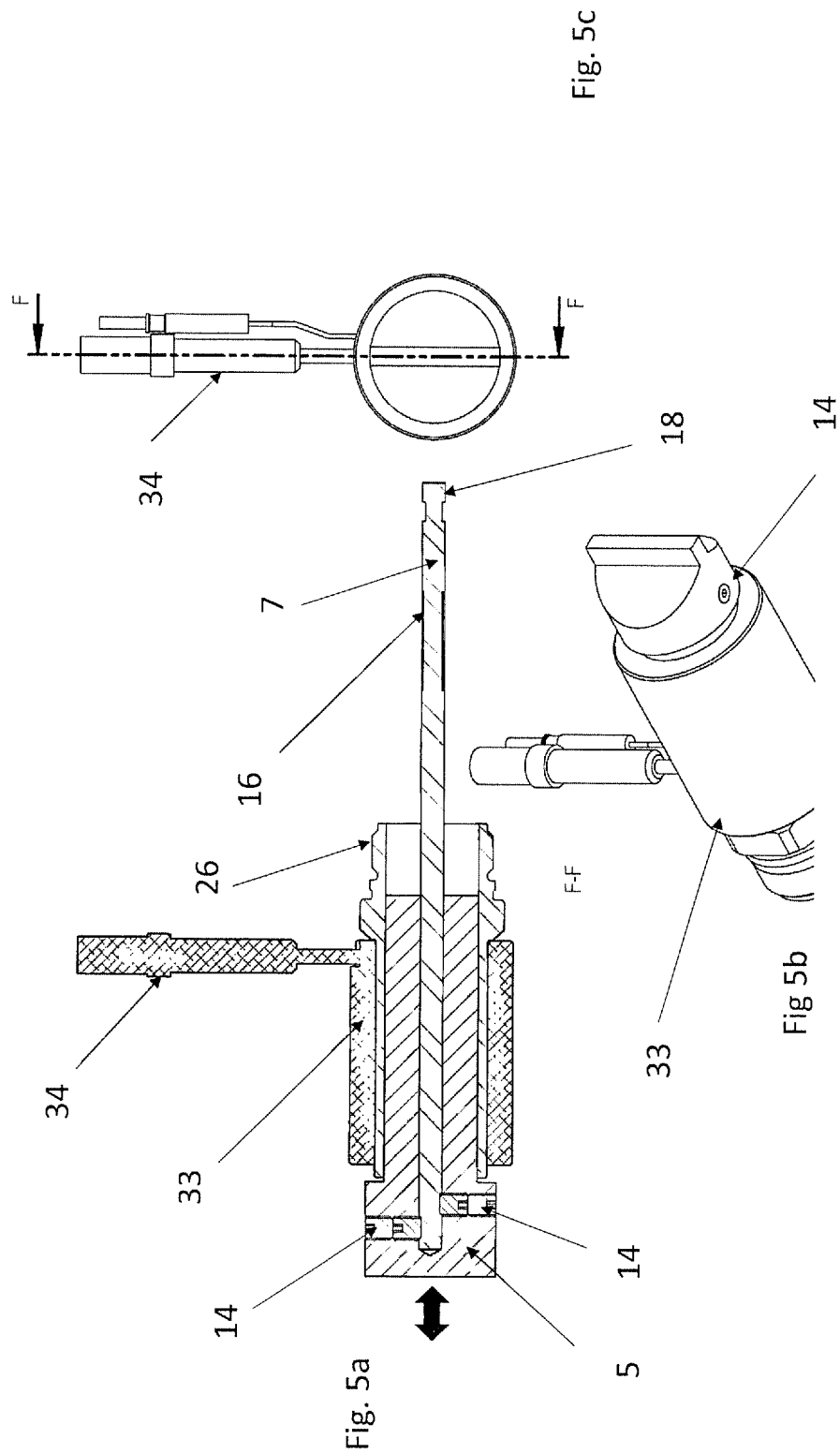

HEATING DEVICE

CROSS-REFERENCE TO RELATED APPLICATIONS

This application claims priority to European Application No. 21184211.7 filed on Jul. 7, 2021.

FIELD OF THE INVENTION

The invention relates to a device for injection molding of injection molded parts from material suitable for injection molding, with at least one first mold part, preferably installed in a fixed position, at least one second mold part, preferably movable, which can be adjusted towards and away from the first mold part, a cavity being formed between the two mold parts in the shape of the injection molded part to be produced, a heater for heating locally the wall of the mold part in the region of the cavity where defects are expected and, a mechanism and process for cooling the heated wall area of the cavity.

BACKGROUND OF THE DISCLOSURE

Typically, injection molding machines are connected to hot runner-systems which are again in connection with the mold. The molten plastic is pressed from the injection molding system via the hot runner-systems into the mold. In general, the hot runner-system, the injection molding machines and the molds are manufactured by different manufacturers. Based on predefined interfaces these components work together in the injection molding process.

A hot runner system typically comprises one or more manifolds having one inlet nozzle connected to an injection molding machine, and one or more nozzles connected to one or more molds without actuator or with actuator, and heating elements.

Such devices for injection molding of parts made of plastic or also of metal are known in the prior art. Particularly in the case of injection molded parts that are to be given a high-gloss surface, it is known that a corresponding wall of the cavity in which the injection molded part is formed is combined with a heater. This makes it possible to heat the corresponding wall of the cavity before the injection molding process or during the injection molding process in order to achieve a corresponding influence on the melt and thus on the surface of the molded part. In order not to prolong the injection cycle excessively due to the additional heating, an additional cooling can be provided which serves to subsequently cool the heated wall of the cavity before the molded part is removed from the cavity by opening the mold.

In the prior art, it is known that a weld line is formed during the injection of moldings, e.g., by parting the melt and joining the melt behind a barrier. This appearance of the weld line is undesirable and should be avoided Based on the prior art described at the beginning, the invention is based on the task of creating a device of the type in which the appearance of a weld line on the molding is at least largely avoided with little effort and without significantly impairing the injection cycle, or in which partial heating, is required for other reasons, e.g., of thinner flow paths.

SUMMARY OF THE INVENTION

To solve this problem, the invention proposes that the heating device comprises a heated stamp which is applied to the cavity wall of the mold part (where later on the defect would be visible) for the purpose of heating and is lifted from the cavity wall of the mold part for the purpose of cooling, so that a cooling gap is formed between the heating element and the cavity wall according to the claims.

According to the invention, a heating element is provided which is adjustable into two positions, namely into a position in which the heating element rests against the cavity wall in the corresponding region, and into a second position in which the heating element is raised from the cavity wall. This configuration achieves that for the purpose of heating the cavity wall, in particular in the region of the weld line formed on the molded part, the heating element is placed against the cavity wall, so that the cavity wall is heated by the heating element. After a time lapse sufficient to remove the weld line (this time lapse is preferably a few seconds), the heating element is lifted off the cavity wall, thereby ensuring that no further action of the heating element on the cavity wall occurs. The cavity wall can therefore cool down very quickly in the area to which the heating element was applied. The spacing of the heating element alone creates a cooling gap that can be sufficient to cool the cavity wall, so that the heat energy is dissipated very quickly, and a rapid cooling rate is the result.

It is particularly preferred that the surface of the heating element that can be applied to the cavity wall corresponds approximately to the dimension (length and width) of a weld line or another area of the injection molded part to be partially heated in the cavity. The surface has preferably the shape of a rectangle. Other shapes however are possible.

This design ensures that the heating element only has to have a small dimension, which is cost-effective and also advantageous with regard to the power of the heating element to be applied. Since the cavity wall is only additionally heated in the area of the weld line or, for example, in the area of a thin flow path, it is also possible in a simple manner and very quickly to achieve cooling of this area after lifting off the heating element, which is advantageous for the injection cycle.

In order to keep the mass of the mold part, which is to be heated by the heating element in order to remove the weld line, for example, low, it is preferably provided that the wall thickness of the cavity wall in the region of the mold part is only a few millimetres.

Due to the punctual or linear heating by means of the heating element in connection with the small wall thickness, on the one hand a rapid heating in the desired area of the cavity wall is achieved and on the other hand a rapid cooling of this area is promoted.

Preferably the heating device for locally heating of an injection mold cavity wall, comprises a base plate. The base plate is preferably a square or rectangular block of metal being a stable basis for all components connected to and located on the base plate. The base plate can comprise bores and connectors for cooling fluid or fluid to drive components like an actuator. Also possible is to use areas of the manifold of the hot runner system that might not be necessary to transport fluid plastic to an injection nozzle as a base plate for the heating device. In this context a manifold of the hot runner system then does not need a flow channel but need also to have the possibility to fit the heating device similar to the base plate. In this embodiment the base plate is integrated into the hot runner system or the manifold.

The actuator is preferably located on top of the base plate or the hot runner, to perform linear movements. Other mounting positions are also possible. The linear movement is preferably directed into the direction of the base plate, to move a heated stamp, which is preferably located below the base plate. In a preferred embodiment the base plate has a bore, through which the linear movement is translated to the area below the base plate. In a preferred embodiment the actuator is screwed directly to the base plate. To protect the actuator from heat the base plate can be cooled by a liquid circulation through bores in the base plate. The cooling bores are connectable to a cooling pump to protect the actuator from heat.

In an alternative embodiment the base plate can be an integral part of the housing of the actuator. However, the base plate should have enough strength to carry the heading device and to allow a connection of holding means to establish a link to a hot runner system especially a manifold or the cable channel which holds and routes cables to operate the manifold. The heating device and the hot runner system are firmly connected and the heating device is held by the hot runner system, so that it can be installed and removed together with the hot runner system from the mold cavity.

Also, in a possible embodiment the supply like energy, fluid to drive the heating device can be shared and/or the same connectors or connector plates can be used.

Furthermore, the invention comprises a heated stamp connected to the actuator and driven by the actuator, to perform a linear movement in direction to and from the injection mold cavity wall. The heated stamp is preferably a metal cylinder which is surrounded or penetrated by heating wires to heat the heated stamp. In an alternative embodiment the heated stamp is surrounded by a heater sleeve that can be rotated around the heated stamp or on a shank in which the heated stamp moves up and down. At the lower end the metal cylinder comprises a tip, which can have different shapes depending on the surface to be heated.

The heated stamp is located below the base plate or a hot runner and the actuator is located on top of the base plate or hot runner. To drive the heated stamp the base plate or the hot runner comprises an opening through which the pin extends for transferring the linear movement from the actuator to the heated stamp.

The pin is made from a material that preferably has a low heat conductivity, like certain titan or stainless steel, other metal alloys are possible. Also, ceramic can be a material for the pin.

In a possible embodiment the heating device comprises adjustment means, to adjust the position of the heating device in relation to the mold cavity or in relation to the hot runner system.

In one embodiment the adjustment means are one or more set pins connected to the base plate extending in direction of the heated stamp below the base plate, to hold a position relative to the injection mold cavity wall after assembling in the mold.

In a preferred embodiment the actuator comprises a central bore in which the pin is located. The central bore extends throughout the housing of the actuator having openings on both sides. This allows an exchange of the pin from both sides of the actuator. The moving element within the actuator which linearly moves the pin, comprises also a bore in which the pin is fixed. The fixation of the pin is preferably performed by a position nut. The position nut preferably surrounds the head of the pin and holds the pin in tapered area below the head. When introducing the pin into the actuator the position nut already surrounds the head of the pin. The nuts allow the fine adjustment of the heated stamp with respect to the contact pressure of the heated stamp to the injection mold cavity. Also, an easy adjustment can be performed at a later stage.

In a preferred embodiment the position nut is located in a threaded bore within the actuator. The threaded bore is located in the moving element of the actuator.

In a further embodiment a lock nut is located in the threaded bore within the actuator to counter the position nut to avoid a rotation of the position nut.

In a possible embodiment, a hollow screw can be added after screwing in the lock nut into the threaded bore within the actuator. This screw cab holds a switch cam to trigger a position switch/sensor. The screw is hollow so that a set tool still has access to the position nut and the lock nut.

In a preferred embodiment the threaded bore within the actuator extends to the upper surface of the actuator, so that an access from the upper surface of the actuator is enabled, to allow access to the position nut and/or lock nut. The access to the threaded bore can also be covered by a lid.

In a preferred embodiment the pin comprises a pin head being at least partially encompassed by the position nut holding the pin. Between the pin head and the pin body a narrower neck section (tapering) is located in which portions of the position nut extend to hold the pin. The position nut encompasses the head to reach with its lower section into the neck section to hold the pin head.

In a possible embodiment the heating device comprises a position switch providing information of the position of the heated stamp.

In possible embodiment the position switch is located within or at the actuator, preferably in vicinity of the upper surface of the actuator. In a possible embodiment the position switch is located on top of the actuator being at least in one position in contact with a linear moving component of the actuator. The linear moving component (like the stamp) moves the cam linearly to activate a switch indicating a position of the heated stamp. Optical or magnetic position sensors are also possible, detecting a pattern or a change of pattern. The detection can also be placed on other moved areas. The aim is to detect that the heated stamp is or is not in contact with the cavity.

To fix the heated stamp to the pin screws laterally penetrating the heated stamp can be used. To clamp the heated stamp to the pin the screws fix the pin which extends into a bore within the heated stamp. In an alternative embodiment the heated stamp is screwed on the pin. In this embodiment the heated stamp comprises along this axis a threaded bore in which the pin is screwed having a thread. In alternative embodiments a locking ring or a cotter pin to hold the pin against the stamp are possible.

In a possible embodiment of the invention anti-rotation means are used to prevent the heated stamp to rotate relative to the base plate. Preferably the anti-rotation means are one or more of the following: flat surface being in contact with an-other flat surface, any other surface geometry that gives anti-rotate security is also possible, groove in which a protrusion or a rail is guided. In a possible embodiment parts of the pin are flat being in contact with parts of the baseplate that are also flat and abut each other so that a rotation of the pin is avoided.

According to a possible embodiment the invention comprises holding means enabling the heating device to be hold by a hot runner system. Preferably the holding means are fixed or attached to the base plate.

The holding means comprise one or more bores and screws and/or holding brackets establishing the connection to the manifold of the hot runner system or to a cable channel or other components that are attached to the hot runner system and allow a firm and stable connection. The holding means allow that the heating device can be installed and removed together with the hot runner system. They can also be a structural part of the hot runner system and being integrated into the manifold.

Also, the electrical connectors of the hot runner system can be shared to drive the heating device and/or its controller. The heating device can have an independent controller or can be driven by a controller of the hot runner system and/or injection molding system. In a possible embodiment the actuator of the heating device can be driven based on several sensor information of the hot runner system or the injection molding machine. Normally it is timer driven that is triggered by the injection machine.

In a further embodiment a temperature sensor is attached to a non-moving part of the heating device or the hot runner system measuring the heat of the injection mold cavity wall in the vicinity where the heated stamp is able to contact the injection mold cavity wall. The vicinity is preferably defined by a few millimetres or centimetres distance from the tip of the heated stamp. The sensor does not move together with the heated stamp, so that the sensor can constantly measure the temperature at the area of the injection mold cavity wall that should be heated by the heated stamp. The sensor is automatically placed in the cavity by implementing the hot runner system into the mold so that the temperature sensor is not moving after the mold is assembled. Furthermore, the sensor can be pressed against the mold cavity wall by a spring pre-tensioning.

In a possible embodiment the temperature sensor is connected to the base plate or elements connected to the base plate or to the hot runner manifold and extends, e.g., inside a sleeve in direction of the injection mold cavity wall to measure the temperature of the injection mold cavity wall in the vicinity where the heated stamp is able to contact the injection mold cavity. In another embodiment the sleeve extends through a bore of the heated stamp parallel to the movement direction to measure the temperature as close as possible at the contact point of the tip of the heated stamp. In general, the heated stamp is tapering to the tip, so that a sensor coming from above would have to be guided around the heated stamp. It is also possible that the sensor is guided from above around the heated stamp to vertically extend to the vicinity of the contact point of the tip of the heated stamp.

In a possible embodiment the heating of the heated stamp can be rotated around the heated stamp core, which allows a better routing of the cables.

The heater for the heated stamp can be integrated in the heated stamp or is designed as a separate heater around the heated stamp or a shank in which the heated stamp is moving up and down. This way the complete heater including the lead can be rotated. This makes it easier to place the cable in an area where it belongs.

In a possible embodiment the actuator is electric driven or fluid driven (air or hydraulic).

In a further embodiment the invention comprises a hot runner system comprising holding means to physically hold the heating device being an integral part of the hot runner system, so that the heating device can be installed and removed by installing and removing the hot runner system or that the majority of the weight is carried by the hot runner system.

In a further embodiment the hot runner system comprises holding means to physically hold a heating device for locally heating of an injection mold cavity, wherein the holding means are configured so that the main or total weight of the heating device is carried by the hot runner system or that the heating device can be installed and removed together with the hot runner system. Especially the fixing points of the hot runner system are used to also carry and fix the heating device, so that the heating device does not need any additional fixing means. The heating device comprises an actuator to perform a linear movement; a heated stamp is connected to the actuator and driven by the actuator, to perform a linear movement in direction to and from the injection mold cavity, wherein the heating device is driven by the same media or energy as provided for the hot runner system. Preferably the media are fluids, hydraulic or pneumatic fluids and/or electricity.

In a possible embodiment the heating device can share the same sensor cables and/or cable channels and/or adapter plates and/or connector plates at which the connectors are fixed with the hot runner system. Even connectors of the hot runner system can be shared.

In a preferred embodiment the manifold or cable holders of the hot runner system comprise brackets or struts to hold the heating system in place.

BRIEF DESCRIPTION OF THE DRAWINGS

FIG. 4A shows a side view of the tip of the heating device.

FIG. 4B shows a sectional bottom view from the tip to the actuator of the heating system along E-E.

FIG. 4C shows the pin tube with the anti-rotation means.

FIG. 5A shows a sectional view of the heated stamp and the pin along F-F.

FIG. 5B shows a perspective view of the heated stamp from the bottom.

FIG. 5C shows a top view of the heated stamp and the pin.

DETAILED DESCRIPTION OF PREFERRED EMBODIMENTS

In the following embodiments shown in the Figs. as discussed, without the intention to limit the scope of protection of the claims.

Figure 1:
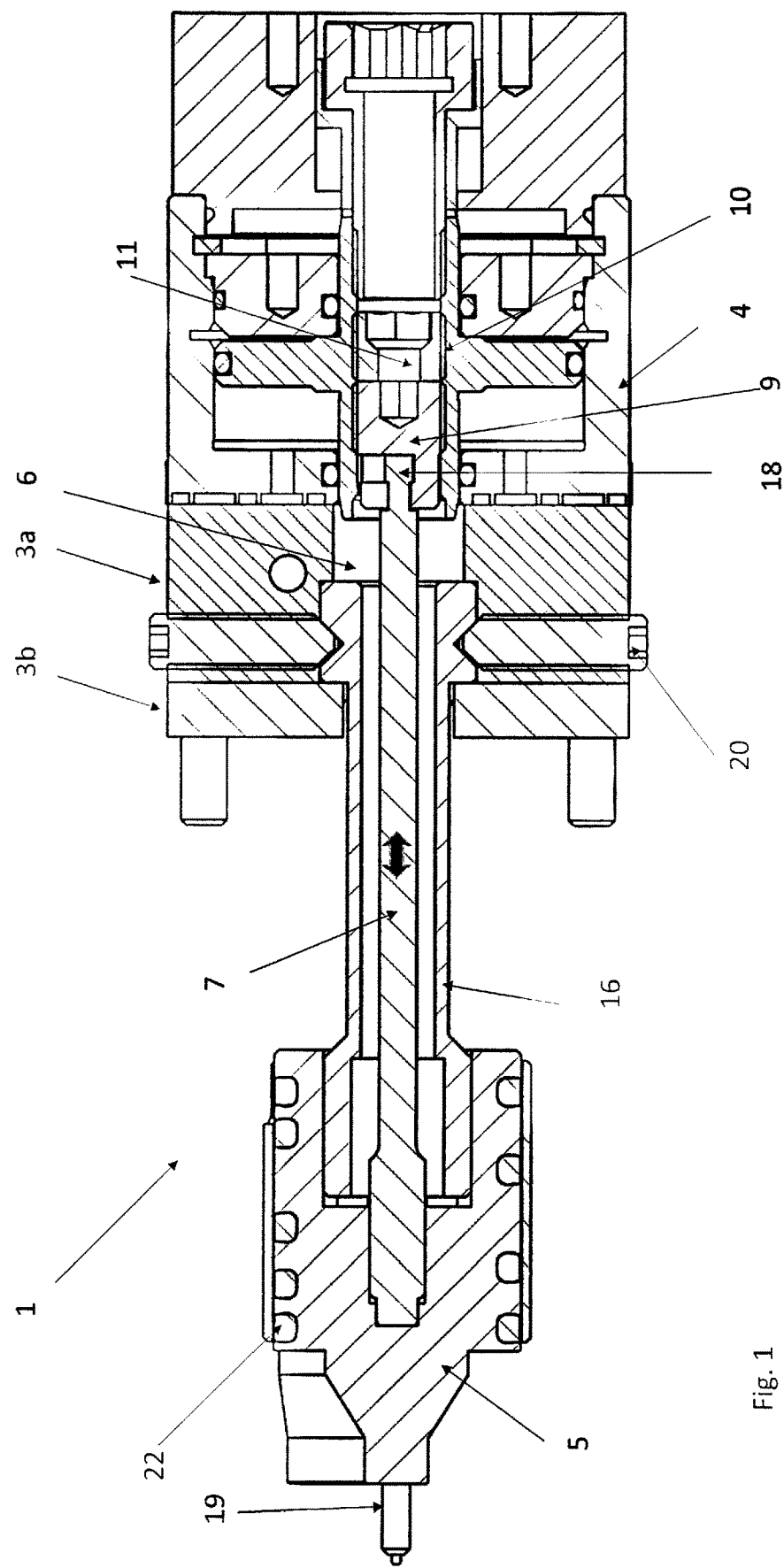
FIG. 1 shows a sectional view of the heating device according to the invention.
Figure 2:
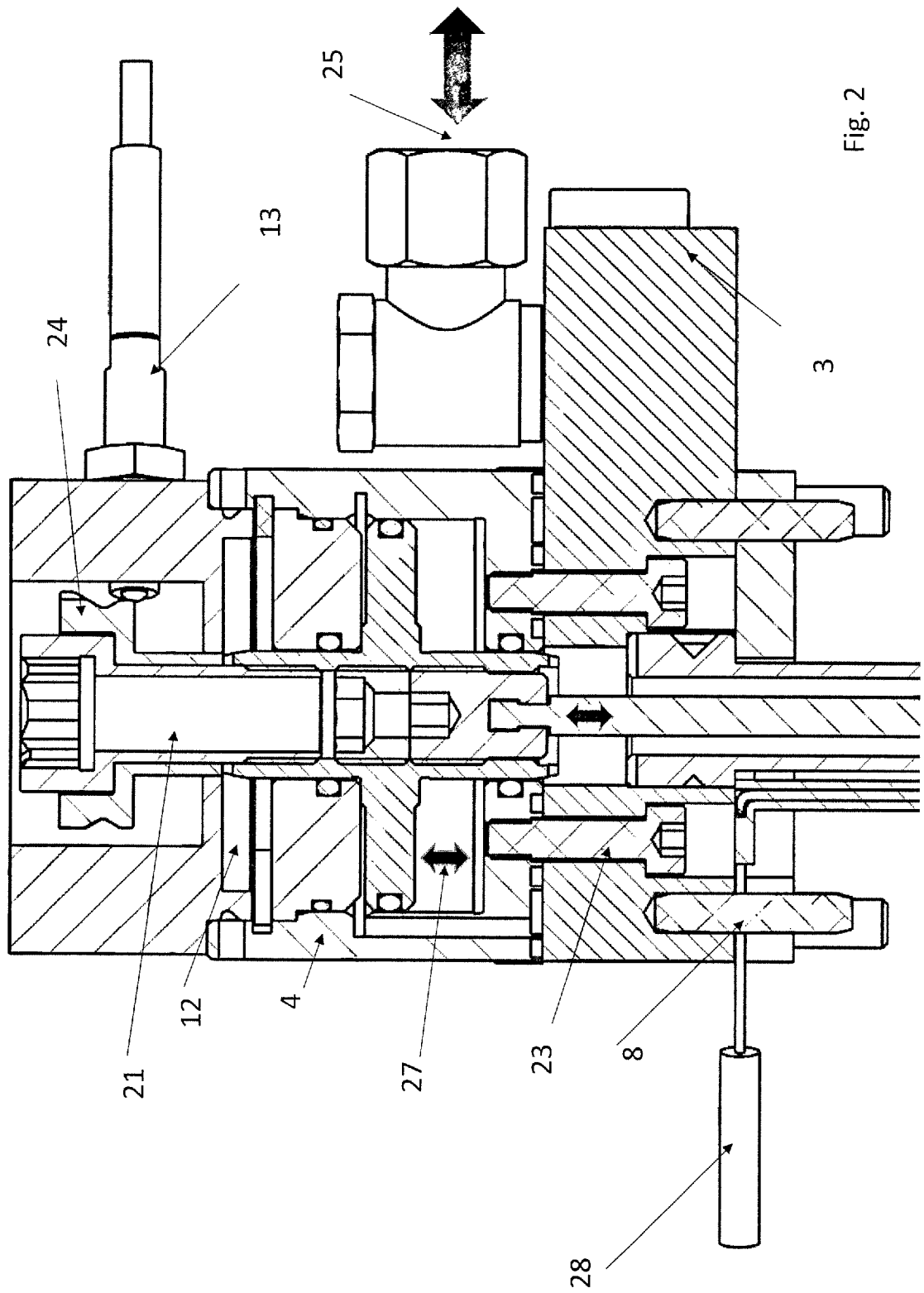
FIG. 2 shows a sectional view of the upper part of the heating device according to the invention focusing on the actuator.
Figure 7A:
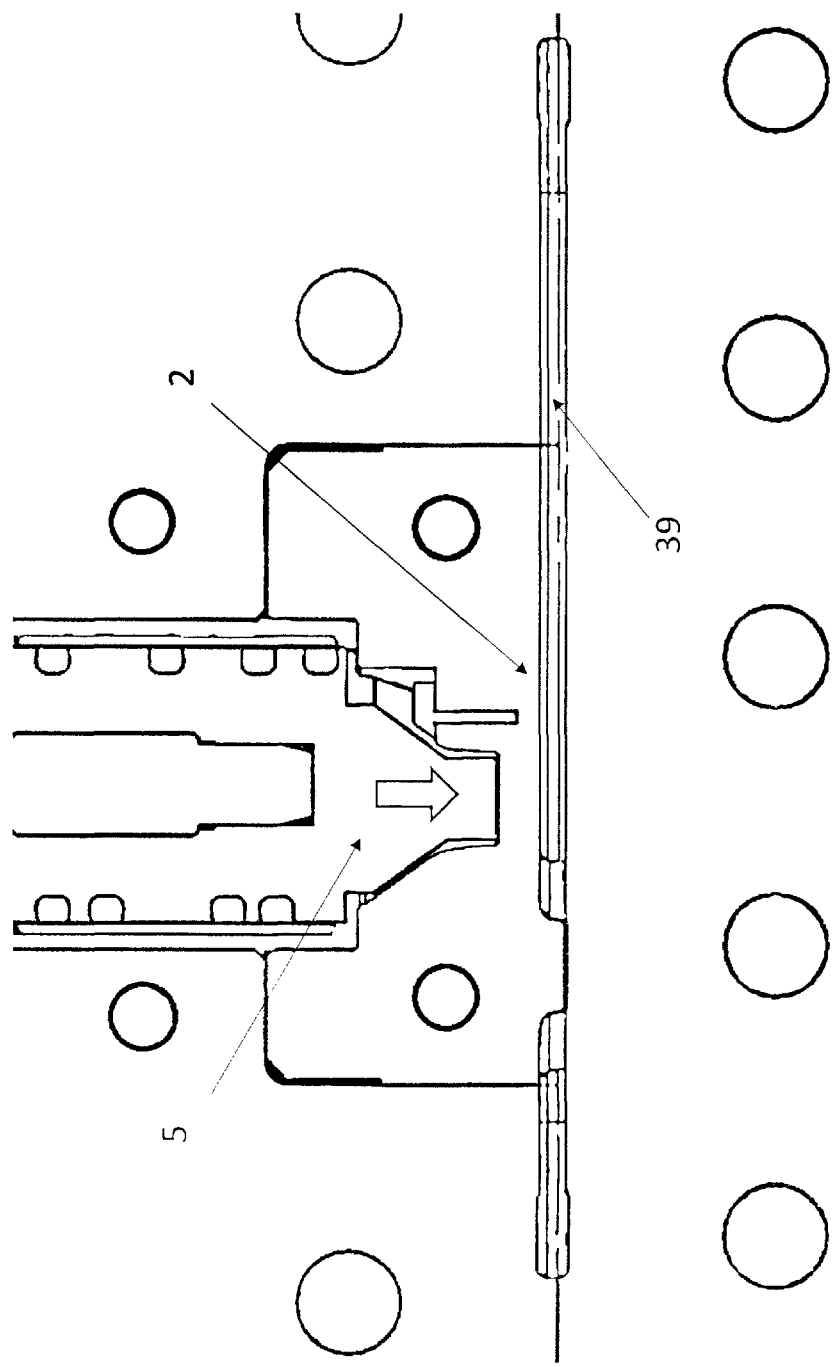
FIGS. 7A and 7B show the linear movement of the heated stamp on and off.

FIG. 1 shows a sectional view of a heating device 1 for locally heating of an injection mold cavity wall (2). A base plate 3a/3b, which is located between a heated stamp 5 and an actuator 4. The actuator 4 is located on top the base plate (in the figure on the right side), to perform a linear movement 27 (FIG. 2). In the center of the actuator is a bore which is at least partially threaded. The bore extends from the top to the bottom of the actuator, so that pin 7 located and fixed within the bore can be introduced from both sides. At the bottom end of the pin a heated stamp 5 is fixed. The pin translates the linear movement of the actuator to the heated stamp. By this linear movement the heated stamp is moved in direction the injection mold cavity wall and brought into contact with the injection mold cavity to locally heat the injection mold cavity wall (FIG. 7A).

The heated stamp 5 is located below the base plate and the actuator 5 is located on top of the base plate. A vice versa implementation is also possible. The base plate comprises an opening 6 through which the pin 7 extends for transferring the linear movement from the actuator to the heated stamp.

The pin is surrounded by a pin tube 32 which also serves as an anti-rotation means. At distinct areas of the (top and or bottom) pin tube 32 flatted side walls are designed which are in contact with flatted areas of the heated stamp and the base plate 3A, which prevents the heated stamp to rotate.

The pin tube is made of a less heat conductive material to reduce heat loss from the heated stamp. This part does not move relative to the base plate.

The pin tube is fixed in the base plate by screws 20 and or by the base plate 3b. A slide offset of the screws to the groove takes care that the pin tube is pressed against the base plate. This could also be used to define the angle of the heated stamp if rotation would be adjustable (no anti-rotation flats on pin tube and base plate).

Within the central bore of the actuator a position nut 9 and a lock nut 10 are located to fix the requested position of the heated stamp and set a stroke limitation. The nuts are screwed into the threaded bore. The position nut embraces a pin head 18 and holds the pin which enables the actuator to drive the pin in both directions through an opening 6 in the base plate. The lock nut has the function of counter screws Parallel to the pin a temperature sensor 19 extends from the base plate to measure the temperature on the surface of the injection mold cavity in vicinity of the contact area of the heated stamp.

On the upper surface 12 of the actuator a position switch 13 is located. In this area anti-rotate secured switching cam held by hollow screw is located. The hollow structure allows access to the position nut and the lock nut below.

FIG. 2 shows a sectional view of actuator 4 on top of the base plate 3. The base plate and the actuator 4 are held together with screws 23, which extend from the bottom of the base plate through the base plate into the bottom surface of the actuator 4. The base plate also comprises fluid inlet/outlet 25 for fluid (air/hydraulic) to drive the actuator and/or for cooling purposes to cool the actuator to protect the actuator from the heat of the surrounding components The inlet/outlet 25 can be located at different positions on top at the side or at the bottom of the base plate. In some embodiments the fluid inlet/outlets are located directly at the housing of the actuator.

Also, in the baseplate set pin(s) 8 are located to define and keep the distance between the injection mold cavity 2 and the heated stamp. The set pins are located in bores preferably blind bores and are pressed into the bores.

Furthermore, the outlet of the temperature sensor extends below the base plate to a side of the base plate.

The arrow 27 shows the linear movement directions of the actuator. Position switch 13 is triggered by a switch cam 24 that is driven by the linear movements of the actuator. The switch cam 24 is fixed to an upper end of the threaded bore by a hollow screw 21 which extends into the threaded bore and is located above the lock nut and position nut.

Figure 3:
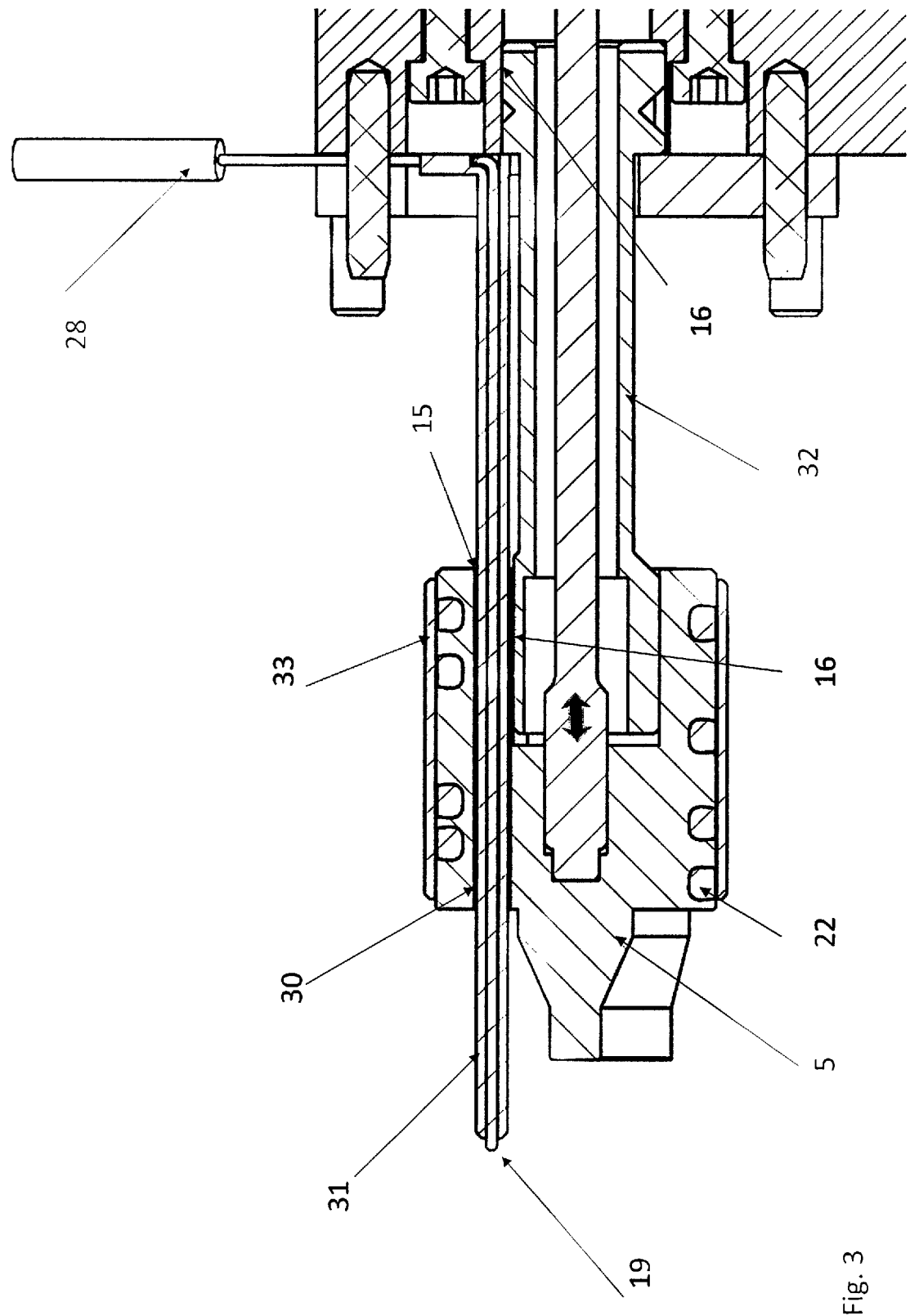
FIG. 3 shows a section view of the lower part of the heating device according to the invention focusing on the heated stamp and the temperature sensor.

FIG. 3 shows a sectional view of the lower part of the invention. The temperature sensor 19 extends through a bore/passage 15 in the heated stamp 5. A gap 30 in the bore passage 15 prevents an overheating of the temperature sensor 19 and its cables. Additionally, a protection pipe 31 surrounds the temperature sensor and its cables as a heat protection. The heated stamp has at its outer surface a heating coil or heating element 22 which is wrapped around a core of the heated stamp. The core has notches surrounding the core in the shape of a coil. The valve pin is movable up and down in a pin tube 32 which has at each end anti-rotation flat surfaces 16 that prevent rotation of the heated stamp.

FIG. 4A shows a sided view of the heated stamp with the rotatable heating device 33 and the outlet 34 of the heating. FIG. 4b shows a sectional view along the cut E-E of FIG. 4a. FIG. 4b shows that the heater/heating can be turned to change the location of an outlet 34, so that the cabling can be adapted to the location when fixed to the hot runner system.

FIGS. 5A-5C show the heating device 33 and the outlet 34 in a sectional view. Also, it is disclosed that heated stamp 5 is fixed to the pin 7 by screws 14, which are screwed into threaded bores extending into a center bore in which the pin is located.

Figure 6B:
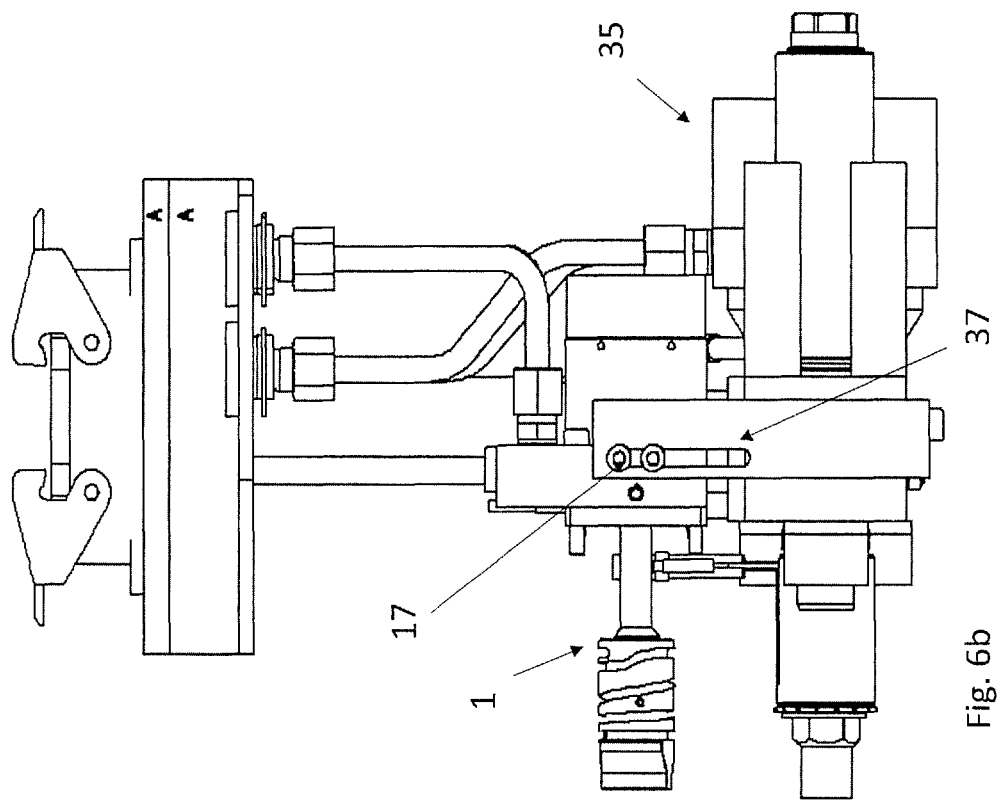
FIGS. 6A and 6B show the mounting of the heating device to a hot runner system sharing the same cable channel and connector plates.
Figure 6A:
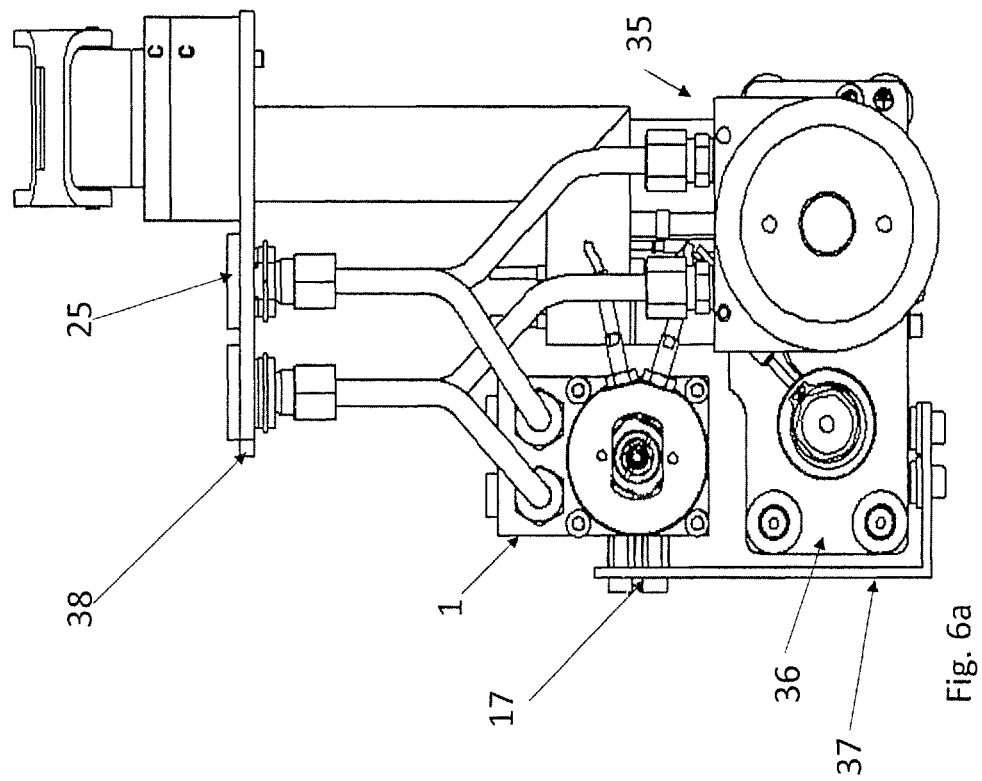

FIG. 6A shows a top view of the heating device attached by a bracket 37 to the hot runner system 35. Due to the slotted bracket a flexible mount to the hot runner system is possible. In the FIG. 6A the bracket is L-shape and is on one end connected to the manifold 36 of the hot runner system 35 and on the other end to the heating device. In a possible embodiment the bracket is attached to the base plate of the heating device. Different shapes for both the heating device and the brackets are possible (like a straight bracket, a rounded bracket, etc.).

Supports for adaptation on bracket or holding means take care for flexible mounting on hot runner system.

Sensor cables and actuator powering (oil, air or electric) is integrated in the same cable channel and/or connector plate like the sensor and/or actuator powering of the hot runner system.

Complete system has everything included no separate assembling is necessary.

FIG. 6B shows a side view of FIG. 6A, where the slotted bracket can be seen. The bracket 37 is screwed to the manifold and the base plate. Each of them has threaded bores in which screws extend.

This allows a flexible mounting on the hot runner since slots on bracket or holding means 17 take care for flexible mounting on the hot runner system. The holding means comprise screws, the bracket 37, and bushings between the bracket and the screws.

Figure 7B:
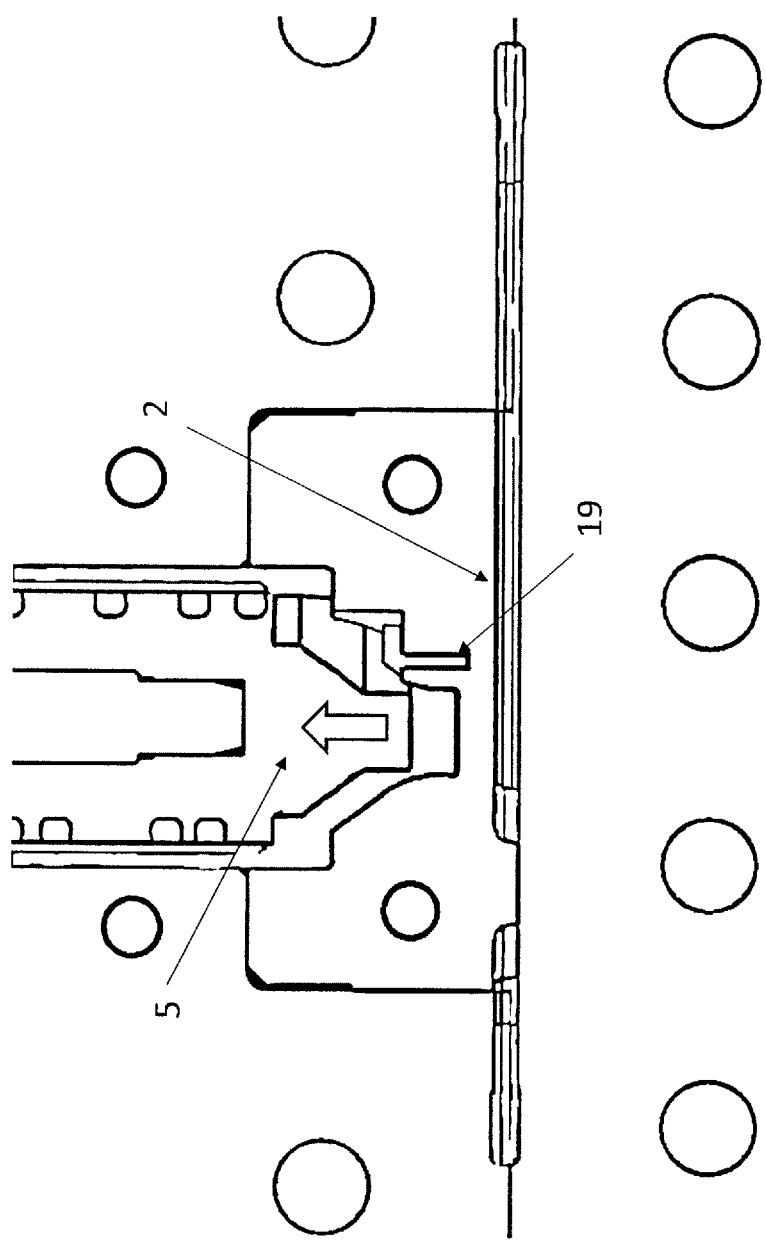

FIG. 7A shows that the heated stamp 5 is in contact with the injection mold cavity wall 2 and is heating the contact area to improve the quality of the injected plastic 39. FIG. 7b shows the heated stamp 5 removed from the injection mold cavity wall 2 so that the plastic can cure (e.g., solidify and/or harden).

Figure 8:
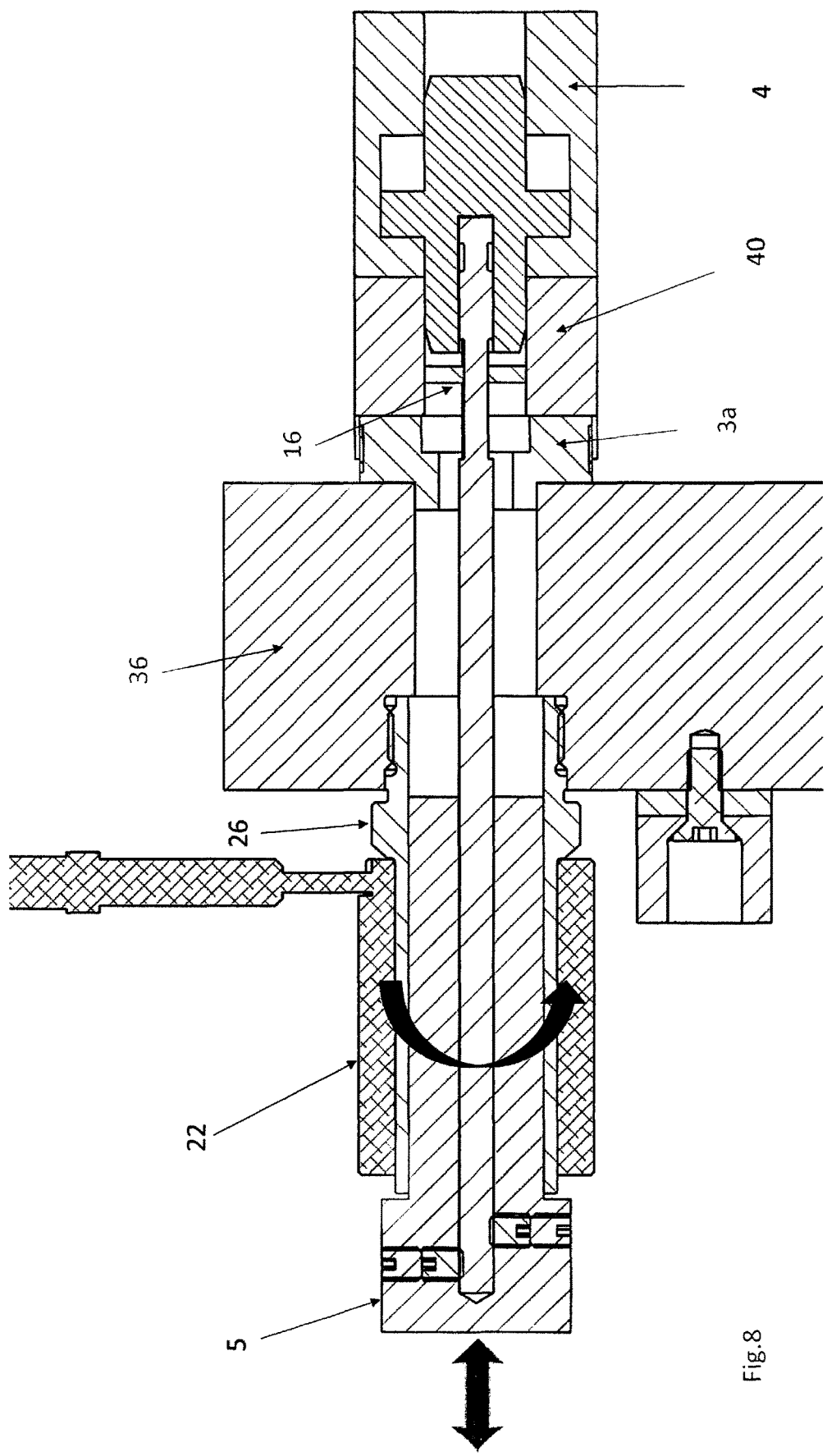
FIG. 8 shows the invention in sectional directly mounted on a manifold.
Figure 9:
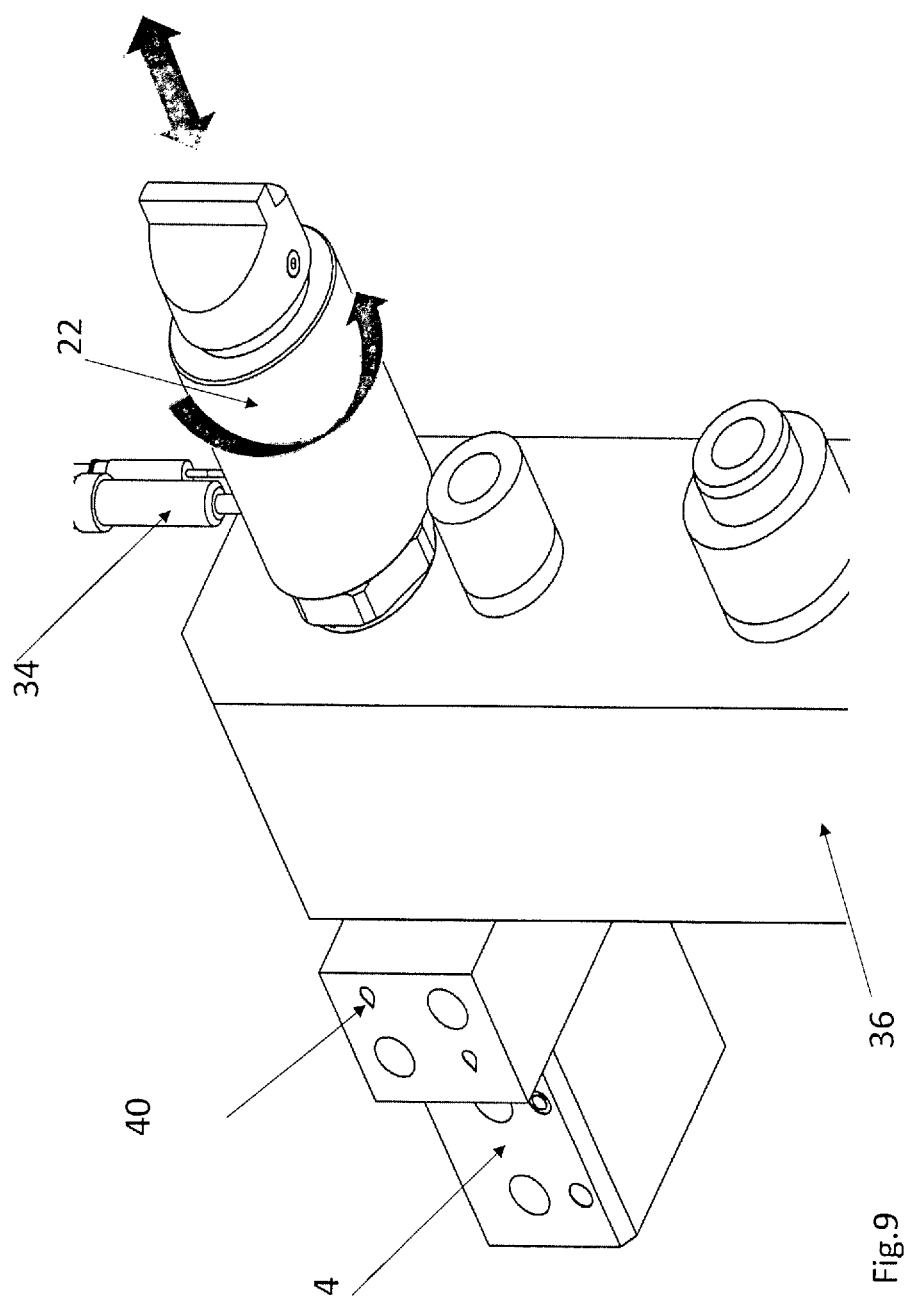
FIG. 9 shows a perspective view of the heating device mounted on a manifold.

FIG. 8 shows a sectional view through a device according to FIG. 9. Between the manifold 36 and the actuator 4, a cooling device 40 is located, to prevent heat damage to the actuator. Base plate 3a is located directly on the manifold 36. The heating device 22 is designed as a sleeve that can be rotated around the heated stamp 5.

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

LIST OF REFERENCE NUMERALS 1 heating device
2 injection mold cavity wall
3a/b base plate
4 actuator
5 heated stamp
6 opening in the base plate
7 pin
8 dowel pin(s)
9 position nut
10 threaded bore
11 lock nut
12 upper surface of the actuator
13 position switch
14 screws clamping the pin
15 bore/passage within the heated stamp
16 anti-rotation means
17 holding means
18 pin head
19 temperature sensor
20 set screw
21 hollow screw
22 heating
23 screw to fix the actuator to the base plate
24 Switch cam
25 fluid inlet/outlet
26 Shank
27 stroke path/linear movement
28 outlet of the temperature sensor
30 gap in the bore/passage
31 protection pipe/lance of the temperature sensor
32 pin tube
33 Rotatable heating around the heated stamp or shank
34 outlet of the heating
35 hot runner system
36 manifold of the hot runner system
37 slotted bracket to flexibly holding the heating device
38 connector plate
39 plastic
40 Cooling

The invention claimed is:

1. A heating device for locally heating an outer surface of a wall of an injection mold having a plurality of gates, comprising:
    a hot runner system including a manifold having a system of channels for distributing molten plastic from an injection molding machine to the plurality of gates;
    a base plate;
    an actuator located on the base plate to perform a linear movement;
    a heated stamp connected to the actuator and driven by the actuator to perform a linear movement of the heated stamp toward and into physical contact with the outer wall of the mold remote from the gates to conduct heat through the wall of the mold to a mold cavity, and to perform a linear movement of the heated stamp away from and out of contact with the outer wall of the mold to allow cooling of the mold cavity wall;
    wherein the heated stamp is located below the base plate and the actuator;
    wherein the base plate comprises an opening through which a pin extends for transferring the linear movement from the actuator to the heated stamp; and
    wherein the base plate is integrally formed in the manifold of the hot runner system, so that it is part of the manifold.

2. The heating device according to claim 1, comprising one or more alignment elements to align the base plate to the injection mold cavity wall connected to the base plate extending in direction of the heated stamp below the base plate, to hold a position relative to the injection mold cavity wall.

3. The heating device according to claim 1, wherein the base plate comprises bores connectable to fluid to drive the actuator or a cooling pump to protect the actuator from heat.

4. The heating device according to claim 1, further comprising a position nut holding the pin, wherein the position nut is located in a threaded bore within the actuator.

5. The heating device according to claim 4, wherein the threaded bore within the actuator extends to the upper surface of the actuator, so that an access from the upper surface of the actuator is enabled, to allow access to the position nut and/or lock nut.

6. The heating device according to claim 1, further comprising a position sensor providing information of the position of the heated stamp.

7. The heating device according to claim 1, further comprising anti-rotation surfaces preventing the heated stamp to rotate relative to the base plate.

8. The heating device according to claim 1, further comprising a bracket enabling the heating device to be fixed to the hot runner system.

9. The heating device according to claim 8, wherein screws secure the bracket to the manifold of the hot runner system.

10. The heating device according to claim 1, wherein the actuator is electric driven or fluid driven.

11. The heating device according to claim 1, further comprising a temperature sensor attached to a non-moving part of the heating device for measuring the heat of the injection mold cavity wall in the vicinity where the heated stamp is able to contact the injection mold cavity wall.

12. The heating device according to claim 1, further comprising a heating element around the heated stamp that is rotatably mounted on the heated stamp or a shank in which the heated stamp is moving up and down.

* * * * *